(12) United States Patent
Barman et al.

(10) Patent No.: US 11,110,455 B2
(45) Date of Patent: Sep. 7, 2021

(54) MICROFLUIDIC DEVICE FOR ELECTRICALLY ACTIVATED PASSIVE CAPILLARY STOP VALVE

(71) Applicants: IMEC VZW, Leuven (BE); Katholieke Universiteit Leuven, KU LEUVEN R&D, Leuven (BE)

(72) Inventors: Ujjal Barman, Leuven (BE); Benjamin Jones, Kessel-Lo (BE); Paolo Fiorini, Brussels (BE); David Mikaelian, Brussels (BE)

(73) Assignees: IMEC VZW, Leuven (BE); Katholieke Universiteit Leuven, KU LEUVEN R&D, Leuven (BE)

(*) Notice: Subject to any disclaimer, the term of this patent is extended or adjusted under 35 U.S.C. 154(b) by 239 days.

(21) Appl. No.: 16/410,622

(22) Filed: May 13, 2019

(65) Prior Publication Data

US 2019/0351415 A1 Nov. 21, 2019

(30) Foreign Application Priority Data

May 15, 2018 (EP) .................................... 18172447
Jun. 27, 2018 (EP) .................................... 18180161

(51) Int. Cl.
*B01L 3/00* (2006.01)
*F16K 99/00* (2006.01)

(52) U.S. Cl.
CPC .... *B01L 3/502738* (2013.01); *F16K 99/0017* (2013.01); *F16K 99/0042* (2013.01);
(Continued)

(58) Field of Classification Search
CPC ......... B01L 3/502738; B01L 2200/143; B01L 2300/0645; B01L 2300/0829;
(Continued)

(56) References Cited

U.S. PATENT DOCUMENTS

2003/0049177 A1 3/2003 Smith et al.
2015/0238961 A1* 8/2015 Vrouwe ............ B01L 3/502738
                                              204/453

FOREIGN PATENT DOCUMENTS

WO  2014/051427 A1  4/2014
WO  2014/144548 A2  9/2014
WO  2014/144548 A3  9/2014

* cited by examiner

*Primary Examiner* — Jennifer Wecker
*Assistant Examiner* — Kathryn Elizabeth Limbaugh
(74) *Attorney, Agent, or Firm* — McDonnell Boehnen Hulbert & Berghoff LLP

(57) ABSTRACT

A microfluidic device for electrically activating a passive capillary stop valve, an apparatus and method are provided. The microfluidic device includes a first channel for containing a first fluid, and an output channel, wherein the first channel comprises a first interface with the output channel, and the first interface comprises a capillary stop valve characterised in that the microfluidic device also comprises a second channel for containing a second fluid, wherein the second channel comprises a second interface with the output channel, and the first channel and the second channel are electrically isolated from each other, and the first interface and the second interface are arranged relative to each other thereby being configured to activate fluid flow from the first channel into the output channel when a first fluid and a second fluid are present, and an electrical potential difference is applied between the first fluid and the second fluid.

18 Claims, 11 Drawing Sheets

(52) U.S. Cl.
CPC . *B01L 2200/143* (2013.01); *B01L 2300/0645* (2013.01); *B01L 2300/0829* (2013.01); *B01L 2300/0861* (2013.01); *B01L 2300/161* (2013.01); *B01L 2400/0415* (2013.01); *B01L 2400/0688* (2013.01); *F16K 2099/0084* (2013.01)

(58) Field of Classification Search
CPC ....... B01L 2300/0861; B01L 2300/161; B01L 2400/0415; B01L 2400/0688; F16K 99/0017; F16K 99/0042; F16K 2099/0084
See application file for complete search history.

Fig. 1d  SECTION A-A

SECTION A-A

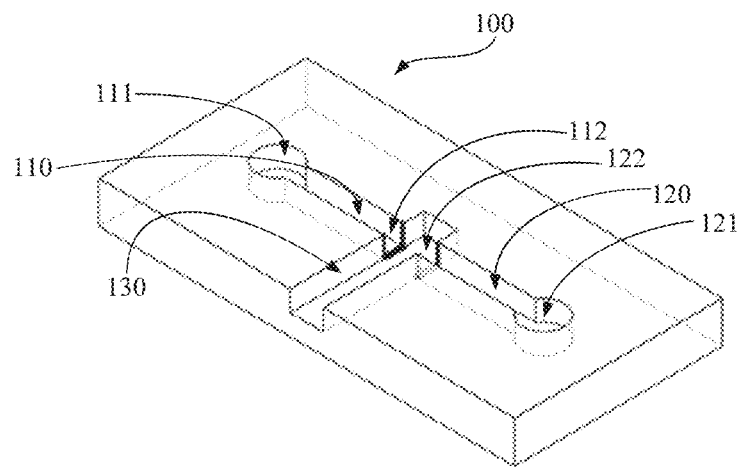
Fig. 4a
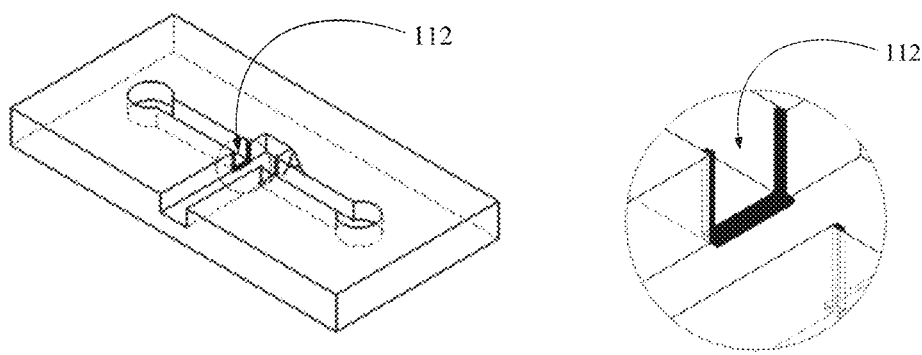
Fig. 4b
Fig 4c
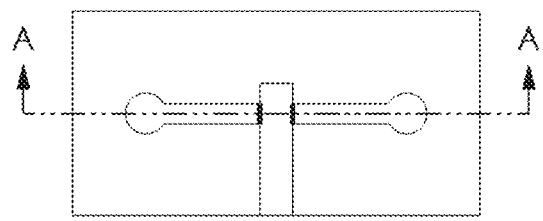
Fig 4d
SECTION A-A
Fig 4e

SECTION B-B

SECTION A-A

MICROFLUIDIC DEVICE FOR ELECTRICALLY ACTIVATED PASSIVE CAPILLARY STOP VALVE

CROSS-REFERENCE TO RELATED APPLICATIONS

The present application claims priority to European Patent application no. 18180161.4, filed on Jun. 27, 2018 which in turn claims priority from European provisional application no. 18172447.7, filed on May 15, 2018, both of which are hereby incorporated by reference in their entirety.

TECHNICAL FIELD

The present disclosure relates to microfluidic devices comprising capillary stop valves which utilize capillary action.

BACKGROUND

Microfluidic devices are now a popular choice as a platform for fluid manipulation, testing and analysis in support of chemical and biochemical applications. These devices offer benefits due to their scale resulting in rapid process times, small size, a reduced need for expensive reagents and associated cost benefits. They come in many different types and are sometimes referred to as Lab On Chip (LOC) systems and are used extensively in pharmaceutical testing, food and water quality assessment and medical diagnostics among other applications.

Microfluidic devices utilizing capillary action to promote fluid flow are of interest because they negate the requirement for bulky pumps, valves and other equipment needed by pressure driven systems. However, capillary driven systems are more challenging to control than traditional pressure driven systems and rely primarily on passive control and actuation which does not involve the use of moving mechanical parts.

A capillary stop valve is a good example of a passive control device used commonly in microfluidic systems. It can be used in many different types of microfluidic circuit contributing toward a wide range of effects including, but not limited to, timing control, quantity measurement, process activation, and reagent mixing. There are two primary methods of implementing capillary stop valves which are usually referred to as geometric and hydrophobic stop valves. Both methods bring about a sudden change to the effective contact angle between a fluid and the surface it is in contact with. The geometric stop valve uses an abrupt change in geometry to bring about the change in effective contact angle, while the hydrophobic stop valve uses an abrupt change to wettability of the surface, usually changing from hydrophilic to hydrophobic. When the effective contact angle changes abruptly, fluid flow is arrested and the fluid will not flow again until the capillary stop valve is activated. The details and workings of capillary stop valves are now well established and known to the skilled person.

Once fluid flow has been arrested at the capillary stop valve, it will remain stationary for an indefinite period unless external forces act upon it or other factors reassert capillary action. It can be difficult to activate the valve controllably so that fluid will flow through the valve. Vrouwe et al (US patent publication no. 2015/00238961A1) disclose an approach where a first electrode is in contact with the stationary fluid at the capillary stop valve and a second electrode is spaced apart from the capillary stop valve by an electrically insulating medium gap. By applying an electric potential difference between the electrodes, the capillary stop valve is activated and the fluid flows down into another channel.

SUMMARY

A microfluidic device for electrically activating a passive capillary stop valve is presented. According to an example embodiment, the microfluidic device comprises a first channel for containing a first fluid, and an output channel. The first channel comprises a first interface with the output channel, and the first interface comprises a capillary stop valve. The microfluidic device also comprises a second channel comprising a second interface with the output channel. The first channel and the second channel are electrically isolated from each other. The first interface and the second interface are arranged relative to each other thereby being configured to activate fluid flow from the first channel into the output channel when a first fluid and a second fluid are present, and an electrical potential difference is applied between the first fluid and the second fluid.

An example embodiment provides a first channel for containing a first fluid and a second channel for containing a second fluid wherein the first channel and the second channel are electrically isolated from each other. The electrical isolation of channels ensures that when present, the first fluid and the second fluid are electrically isolated prior to activation of the capillary stop valve of the first interface. Both the first fluid and the second fluid can then act as fluid electrodes to conduct electrical energy, i.e. the first fluid and the second fluid are conductive. This does not require the use of any special fluids as reagents and biological samples commonly used in microfluidics devices have sufficient conductivity for this purpose, but fluids considered as dielectrics, e.g. mineral oil or silicone oil should be avoided. However, the fluids may either be the same or different, and may each be a compound, a mixture, a solution, or a suspension, e.g. a suspension of biological cells.

The use of fluid electrodes allows for the implementation of the microfluidic device without the need for a metal layer which would add complexity and cost to fabrication. Instead, electrical contacts may be placed in connection with each of the two fluids at a convenient point some distance from the first interface and the second interface, or even connected to a plurality of interfaces to create a microfluidic system comprising a plurality of capillary stop valves. Consequently, the first fluid and the second fluid may be connected to different poles of an electrical energy source.

The microfluidic device according to an example embodiment can be arranged so that the first interface and the second interface are configured to activate fluid to flow substantially horizontally from the first channel into the output channel. According to another example embodiment, the microfluidic device can be arranged so that the first interface and the second interface are configured to activate fluid to flow substantially vertically from the first channel into the output channel. Hence, the device may be oriented to activate fluid flow in either the vertical or the horizontal plane, or any other desired orientation, whereas it may be difficult to fabricate an electrode on a vertical wall for activating a conventional capillary stop valve when oriented for fluid flow in the horizontal plane.

In an example embodiment, the second interface (i.e. the interface between the second channel and the output channel) comprises a means of arresting fluid flow between the second channel and the output channel. The means may comprise a second capillary stop valve, a blocking membrane, or any other suitable means. In an example embodiment, the second capillary stop valve is a geometric stop valve. In another example embodiment, the second capillary stop valve is a hydrophobic stop valve. In an example embodiment, the first stop valve may be a geometric stop valve. In another example embodiment, the first stop valve may be a hydrophobic stop valve. In some embodiments, when the first interface comprises a first capillary stop valve and the second interface comprises a second capillary stop valve, the menisci of both fluids may deflect and extend toward each other on the application of an electrical potential difference which can reduce the required activation voltage.

Where an example embodiment provides for fluid flow from both the first channel and the second channel, when the first fluid and the second fluid are the same type of fluid, the second channel can also be used to increase the overall flow rate. Clearly, even when the first fluid and the second fluid are of the same type, they are still electrically isolated from each other prior to activation.

In some circumstances it may be desirable to minimise fluid flow from the second channel which may be achieved by providing a limited quantity of the second fluid, or restricting the second interface. This embodiment can provide the required contribution toward valve activation, while having minimal effect on fluid quantity or flow rate out of the output channel.

In an alternative example embodiment, the second interface may comprise a blocking membrane to prevent flow of the second fluid out of the second channel into the output channel. This allows for the utilization of the fluid electrode approach which negates the need for a metal layer and allows for easy deployment for use with both horizontal and vertical flow, but restricts fluid flow to a single input channel. In addition, the second fluid may be either the same as the first fluid or different from the first fluid and may be chosen for its properties of electrical conduction or other factors related to its use as a fluid electrode without consideration of its effect on the chemistry of the microfluidic processes being implemented. For instance, a highly conductive fluid may be used to reduce the activation voltage required.

In another example embodiment which provides for fluid flow from both the first channel and the second channel, the first fluid may be a different type of fluid to the second fluid, e.g. fluid 1 is a biological sample and fluid 2 is a reagent. This embodiment can provide controllable actuation of fluid mixing. Fluid flow of each channel may be further controlled by setting the sizes of the first channel and the second channel to be different in support of different mixing regimes.

In an example embodiment, the first interface and the second interface can be arranged relative to each other so as to be substantially facing each other at opposite sides of the outlet channel. This embodiment can provide ease of implementation and minimizes activation voltage because when the first fluid and the second fluid are present the respective menisci are directly facing each other, thereby providing maximum opportunity to deflect toward each other.

In another example embodiment, a gap may be maintained between the first interface and the second interface by two walls of the output channel. The walls may be those opposite each other, or orthogonal to each other. This situation applies to, but is not restricted to, horizontal flow or vertical flow. This embodiment can provide ease of implementation. When the two interfaces are substantially opposite each other, activation voltage can be minimized and when orthogonal to each other, the passage of a particle suspension can be facilitated.

In another example embodiment, when following the direction of intended flow, the output channel may increase in size (cross sectional area) shortly after the location of the second interface. This aids in minimizing the restriction on flow which may result from a configuration of the first and second interfaces for optimizing activation parameters. This embodiment may be particularly useful when viscous fluids are involved.

In another example embodiment, the cross sectional area of the first channel at the first interface may greater than the cross sectional area of the second channel at the second interface. This embodiment can promote different flow rates for the first fluid and the second fluid during fluid mixing. In another embodiment, the cross sectional area of the first channel at the first interface may be greater than the cross sectional area of the second channel at the second interface, and the cross sectional area of the output channel may also increase when considered in the direction of flow. This embodiment can provide for a mechanism whereby particles, e.g. biological cells, can easily pass where otherwise too narrow a gap exists between the two interfaces. The increase in cross sectional area of the output channel can occur, or begin, immediately after the second interface and prior to the end point of the first interface with respect to the flow direction for the output channel. Such an embodiment can further facilitate the flow of particles.

In another example embodiment, the first channel meets the output channel at the first interface thereby creating an angle between the first channel and the output channel which forms an acute angle on the upstream side of the output channel and an obtuse angle on the downstream side of the output channel. Hence, the angle between the first channel and the output channel at the first interface can direct fluid flow from the first channel toward the flow direction of the output channel which can promote fluid flow from the first channel into the output channel after activation.

In another embodiment, both the first channel and the second channel meet the output channel at the first interface and the second interface respectively, each of the first channel and the second channel form an acute angle on the upstream side and an obtuse angle on the downstream side of the output channel. In addition, the downstream end of the output channel has a larger cross sectional area than the upstream end at the point where it meets the first interface. This embodiment can help to keep activation voltage low because one end of the first and second interfaces are close together, while facilitating the passage of biological cells because the other end offers an increased gap.

In an alternative embodiment, the microfluidic device additionally comprises a third channel for containing a third fluid, and a third interface with the output channel. The third interface comprises a capillary stop valve and can be positioned so that when fluid flows from the first channel and down the outlet channel, it can come in contact with the third interface. When a fluid flowing down the outlet channel comes in contact with the third interface, it can activate the capillary stop valve it comprises. This embodiment can allow for controllable actuation of the capillary stop valve of the third interface based indirectly on electrical activation. At the same time this embodiment can decouple fluid flow parameters of the third channel interface from any flow limitations imposed by optimization for electrical activation. This may be further emphasized in an additional embodiment where the microfluidic device comprises a third channel for containing a third fluid and a third interface with the output channel, the third interface comprising a capillary stop valve. The cross sectional area of the output channel can be larger at the third interface than it is at the first interface. This decoupling can be useful when the microfluidic device is being used for viscous fluids and especially when the fluid comprises large particles, for example biological cells.

A method for electrically activating a passive capillary stop valve according to an example embodiment comprises channeling by capillary action, a first fluid to a first interface with an output channel and arresting the flow of fluid at the first interface with the output channel using a capillary stop valve. The method further involves arresting a second fluid at a second interface with the output channel and arranging the first interface and the second interface relative to each other. Thereafter, applying an electrical potential difference between the first fluid and the second fluid thereby attracting the two fluids toward each other and overcoming the arresting effect of the capillary stop valve to activate the first fluid to flow into the output channel. This embodiment can be useful for controllably actuating capillary stop valves for flow substantially in either the vertical or horizontal plane while avoiding the need for implementing metal layers in the microfluidic device.

In other embodiments, several microfluidic devices comprising any of the preceding embodiments may be combined or cascaded in a microfluidic system to create different effects such as the mixing of multiple fluids or to support arbitrary microfluidic processes.

In an example embodiment where the substrates comprise suitable plastic materials, molding techniques may be used in fabrication. A first substrate can be a photo-patternable polymer (e.g. SU8) deposited on a silicon or a glass or a plastic substrate. Standard photolithographic techniques may also be used. In another example embodiment the first substrate may comprise silicon and a second substrate may comprise a material bondable to silicon, e.g. borosilicate glass. In this example, conventional techniques used in the field of silicon micromachining can be used.

According to another example embodiment, a method for manufacturing an electrically activated passive capillary stop valve comprising two substrates is provided, wherein structures required to pass completely through a first substrate are etched in a first etch step to a depth of more than 10 μm on the front side of substrate, a second substrate is anodically bonded to the front side of the first substrate, the thickness of the first substrate is reduced to less than 500 μm, a first channel and a second channel are etched on the free surface of the first substrate to the depth of the structures patterned in the first etch step.

In another example embodiment, a novel structure is provided for electrohydrodynamic actuation which does not require metal electrodes. Two valves are positioned one in front of the other separated by an air gap and use both fluid medium as electrodes. When a potential difference is applied across the menisci, free charges in the fluid can accumulate at the gas liquid interfaces akin to a capacitor. These charges can generate both coulombic forces and dielectric forces due to permittivity gradient at the gas-liquid interfaces, which can pull the interfaces towards each other. The system can become unstable at a certain distance between the interfaces, and the two menisci snap into contact and the fluids from the first channel and the second channel flow and mix in the output channel.

The fabrication process of the valves can be based on two etch steps. The combination of these two etches can create both microvalves and electrical insulation between the two fluid volumes.

Experiments demonstrated the effectiveness of the proposed design. In order to test the valves, a KCl solution having an electrical conductivity of $1e^{-4}$ S/m and containing a small concentration of rhodamine dye is pipetted into the two reservoirs 111 and 121. From there it reaches the two stop valves via capillary flow. Two electrical probes are immersed in the reservoirs and used to provide a potential difference. A movie of the valve region is recorded while increasing the voltage. This allows determining the actuation voltage and its dependence on valve geometry. In FIG. 12a and FIG. 12b two photograms of the movie, before and after actuation, are shown. In the valve shown the microchannels have a width of 150 μm and a height 250 μm, the air gap is 10 μm and it was actuated at around 40 V. Thus, this technique can be effectively implemented on lab on-chips to actuate capillary stop valves.

BRIEF DESCRIPTION OF THE DRAWINGS

The above, as well as additional objects, features and advantages of the present disclosure, will be better understood through the following illustrative and non-limiting detailed disclosure, with reference to the appended drawings. In the drawings like reference numerals will be used for like elements unless stated otherwise.

FIG. 1b shows a plan view of the representative embodiment of FIG. 1a.

FIG. 1c shows the first interface of the representative embodiment of FIG. 1a.

FIG. 1d shows a cross-sectional elevation of the representative embodiment of FIG. 1a.

FIG. 2b shows a plan view of the representative embodiment of FIG. 2a.

FIG. 2c shows a cross-sectional elevation of the representative embodiment of FIG. 2a.

FIG. 2d shows the first interface of the representative embodiment of FIG. 2a.

FIG. 3b shows a plan view of the representative embodiment of FIG. 3a.

FIG. 3c shows a cross-sectional elevation of the representative embodiment of FIG. 3a.

FIG. 4a presents a perspective view of a representative embodiment where the first interface 112 and the second interface 122 comprise hydrophobic capillary stop valves.

FIG. 4b shows the same perspective view as FIG. 4a highlighting the first interface 112.

FIG. 4c shows a section of the representative embodiment of FIG. 4a illustrating the first interface 112 comprising a hydrophobic capillary stop valve.

FIG. 4d shows a plan view of the representative embodiment of FIG. 4a.

FIG. 4e shows a cross sectional elevation of the representative embodiment of FIG. 4a.

FIG. 5b shows a plan view of the representative embodiment of FIG. 5a.

FIG. 5c shows the second interface of the representative embodiment of FIG. 5a.

FIG. 5d shows a cross-sectional elevation of the representative embodiment of FIG. 5a.

FIG. 6b shows a plan view of the representative embodiment of FIG. 6a.

FIG. 6c shows a cross-sectional elevation of the representative embodiment of FIG. 6a.

FIG. 7b shows a plan view of the representative embodiment of FIG. 7a.

FIG. 7c shows a cross-sectional elevation of the representative embodiment of FIG. 7a.

FIG. 8b shows a plan view of the representative embodiment of FIG. 8a.

FIG. 9b shows a plan view of the representative embodiment of FIG. 9a.

FIG. 10b shows a plan view of the representative embodiment of FIG. 10a.

DETAILED DESCRIPTION

Figure 1A:
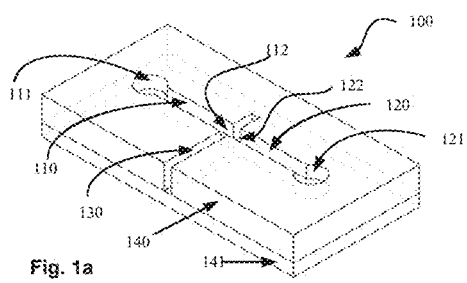
FIG. 1a presents a perspective view of a representative embodiment where fluid flows in the horizontal plane.
Figure 2A:
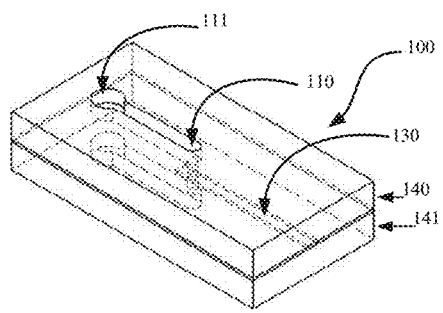
FIG. 2a presents a perspective view of a representative embodiment where the fluid flow of interest is in the vertical plane.

Referring now to FIGS. 1a, 1b, 1c, and 1d, which illustrate an example embodiment of the microfluidic device 100 constructed for controlling a substantially horizontal fluid flow. In this example embodiment, a first substrate 140 can be an electrically insulating substrate and can be connected to a second substrate 141. On this occasion two reservoirs 111, 121, a first channel 110 and a second channel 120 may be created (e.g. etched or machined) only to a partial depth into substrate 140. An output channel 130 may be created to the full depth of substrate 140, thereby coming into contact with substrate 141.

The size and shape of these channels are not restrictive, modern fabrication techniques favor channels which approximate a rectangular cross section, but cylinders and tubes are equally acceptable. Many microfluidic systems employ channels with a rectangular cross section having a width ranging between 100 µm and 200 µm and a depth ranging between 100 µm and 200 µm, correlating to an equivalent diameter ranging between 110 µm and 220 µm (equivalent diameter=diameter of a circular channel that gives the same resistance as an equivalent rectangular channel). These sizes will work well in this embodiment, but much smaller or much larger sizes of channel will still work. The main consideration is that the first channel 110 should support capillary action as the effects of capillary action can increase with decreasing channel cross section. The output channel 130 should also support passive transport mechanisms but should be of sufficient size to support the fluid flow rates needed for any given application, hence it may directly support capillary action due to its cross sectional area, but may also employ other mechanisms such as wicking or other passive flow mechanisms.

Figure 1B:
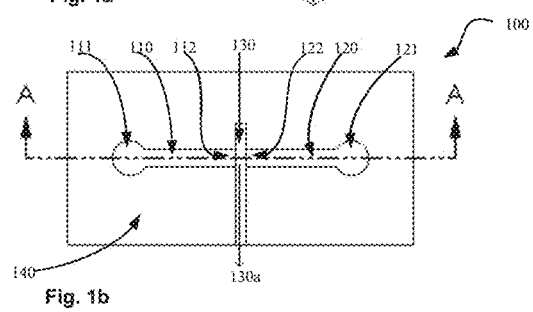
Figure 2B:
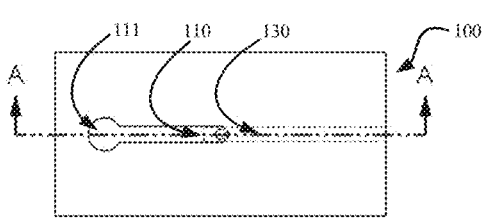
Figure 1C:
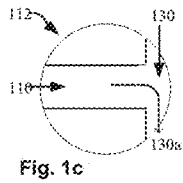

FIG. 1 illustrates an embodiment where both the first interface 112 and the second interface 122 comprise geometric capillary stop valves, but other options are available. It can be seen from FIGS. 1b, 1c and 1d that surfaces of the output channel 130 connected to the first channel 110 and those connected to the second channel 120 are perpendicular to their respective channels, creating an abrupt expansion of the first channel 110 and the second channel 120 thereby providing geometric stop valves.

When a first fluid is loaded into the first reservoir 111 and a second fluid is loaded into the second reservoir 121 the fluids can proceed in the first channel 110 and the second channel 120 by capillary action until they reach the first interface 112 and the second interface 122 respectively. The interfaces 112, 122 can be arranged relative to each other so that if a force of attraction were applied between the fluids due to the application of a potential difference between them, it can pull the first fluid toward the output channel 130 while ensuring the fluids do not come into contact with each other prior to activation, thereby remaining electrically isolated from each other before activation.

To fulfil the requirement of electrical isolation while enabling achievable activation voltages, the distance between the two interfaces 112, 122 should be below the standard microfluidic channel equivalent diameter of 200 µm. However, in most circumstances, practical activation voltages can be achieved when the distance between the two interfaces 112, 122 are further restricted to a few tens of µm, and good results are achieved for distances ranging between 5 μm and 25 μm, but distances below 5 μm may also still be beneficial and can be used to assist in achieving low activation voltages. According to an example embodiment, the voltage used to activate fluid flow can range from 10V to 100V. According to another example embodiment, the voltage used to activate fluid flow can be 50V when combined with a 10 μm distance between the first interface 112 and the second interface 122. According to example embodiments, lower voltages provide activation for gaps below 10 μm. When optimizing the channel interfaces 112, 122, the gap between them, and their orientation, activation voltages of 10V or lower, e.g. 5V, may be successful. This optimization may consider several factors, for example, the design of the geometric capillary stop valve of FIG. 1. Generally, when increasing the cross section of channels 110, 120, lower capillary pressure may be generated which results in a lower force being required to deform the meniscus of the capillary stop valves at the interfaces 112, 122. Hence, to achieve lower activation voltages, larger channel cross sectional areas may be used. However, if the blocking pressure of the capillary stop valve is too low, the valve may fail.

To activate the first capillary stop valve of the first interface 112, the first fluid and the second fluid may be placed in contact with an electrical energy source so that an electrical potential difference may be created between the two fluids. These connections may be provided at any convenient location such as the reservoirs 111, 121 which may be up to 2 cm or further away from the interface. This may be facilitated by the electrically conductive nature of the two fluids. However, this does not necessitate the use of any special fluids or modification of existing reagents.

Upon application of the electrical potential difference to the two fluids, electrical charges may either move toward or away from the two interfaces 112, 122 thereby creating a charge difference between the two fluids and attracting the menisci of the first fluid and the second fluid toward each other. As the first meniscus extends into the output channel 130, it may meet and come in contact with the second meniscus thereby overcoming the effect of the capillary stop valve. The flow direction 130a may then follow as indicated in FIGS. 1b and 1c. Alternatively, in some embodiments (e.g. as may be experienced when hydrophobic capillary stop valves are used or when the second interface 122 comprises a blocking membrane 123) as the first meniscus extends into the output channel 130 the effective contact angle between it and one of the surfaces it is in contact with may change sufficiently to overcome the effect of the capillary stop valve. With the embodiment of FIGS. 1a, 1b, 1c and 1d, when the first capillary stop valve is activated, the first fluid will come into contact with the second fluid and will also activate the second capillary stop valve of the second interface 122 thereby establishing fluid flow from the first channel 110 into the output channel 130 and from the second channel 120 and the output channel 130.

When the first fluid and the second fluid are of a different type e.g. a biological fluid specimen and a buffer or diluting agent, the embodiment of FIGS. 1a, 1b, 1c and 1c may act as a controllable mixer system for mixing the two fluids. The microfluidic device 100 may be used with a wide variety of fluid types including many pharmaceutical compounds, chemicals, biochemicals, water based fluids, suspensions of particles, RNA, DNA or biological cells including blood, and plasma based fluids or even saline based buffers and reagents.

Fluids exhibiting large electrical conductivities can work well and can be used to keep activation voltages low, but are not required. Only moderate conductivity may be required of the two fluids as fluids commonly used for biological applications of microfluidic devices include salts which provide for good conductivity levels. For example, the electrical conductivity of blood and plasma are in the range of 0.1 S/m to 1 S/m and a typical physiological solution (containing 9 g of NaCl/l) is 3.5 S/m, all these values work well. Indeed, it has been found that conductivity values in the range $1e^{-5}$ S/m to $1e^{-4}$ S/m also work well, but lower values could also be used.

The example embodiment of FIGS. 1a, 1b, 1c and 1d and other embodiments where activation of the capillary stop valve of the first interface 112 results in fluid flow from both the first channel 110 and the second channel 120 have a significant advantage for providing the basis of a controllable mixing system. However, the first fluid and the second fluid may be of the same type with flow from both the first channel 110 and the second channel 120 resulting in an increased flow rate.

Figure 2C:
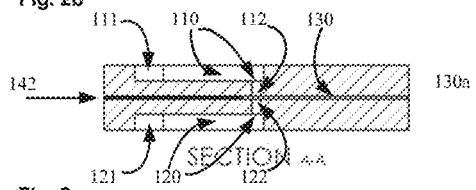
Figure 2D:
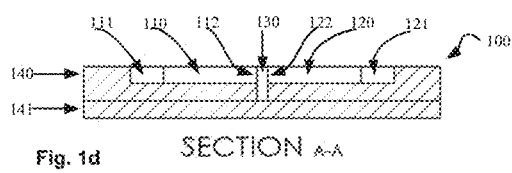
Figure 2D:
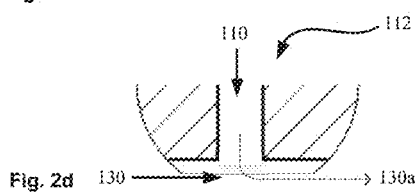

Referring now to FIGS. 2a, 2b, 2c and 2d which illustrate an example embodiment where the fluid flow of interest is in the vertical plane. As shown in these figures, the two substrates 140, 141 may be separated by a spacer 142. The first reservoir 111 and first channel 110 may be electrically isolated from the second reservoir 121 and second channel 120, either by an insulating spacer 142 or by using insulating substrates 140, 141. As with the example embodiment of FIG. 1a, the substrates may comprise a wide range of materials, e.g. Si, $SiO_2$, glass, PDMS (Polydimethylsiloxane) etc. In this example embodiment when fluid may be placed in the first reservoir 111 it flows by capillary action in the first channel 110 which begins with a substantially horizontal orientation, but then turns through 90 degrees so that fluid will flow substantially vertically downwards. It is noteworthy that capillary action, not gravity, provides the motive force for fluid 1 in the first channel. The flow could equally be substantially vertically upwards, and similarly there is no requirement for any of the first channel 110 to be oriented in the horizontal plane, the input or first reservoir 110 could be positioned directly above the first channel 110 and the first interface 112. However, in this example, the output channel 130 may be oriented in a substantially horizontal direction, but could also be oriented in other directions. The activation mechanism may be the same as for the first embodiment of FIG. 1a, and once activated, the direction of fluid flow 130a may be as shown in FIG. 2d.

Figure 3A:
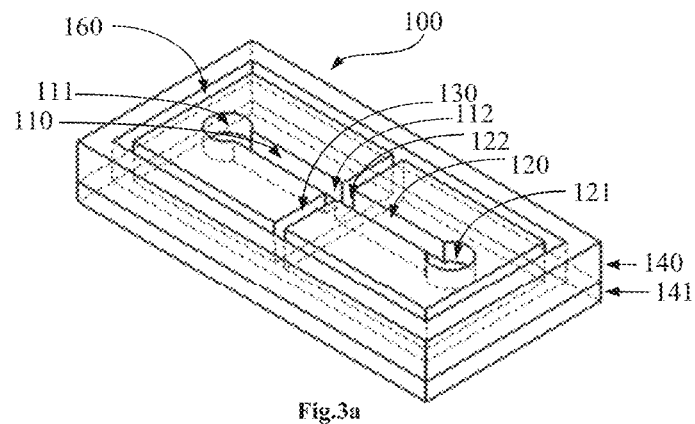
FIG. 3a presents a perspective view of a representative embodiment where fluid flows in the horizontal plane and the first channel and the second channel are electrically isolated from each other by trenches etched into a substrate.
Figure 3B:
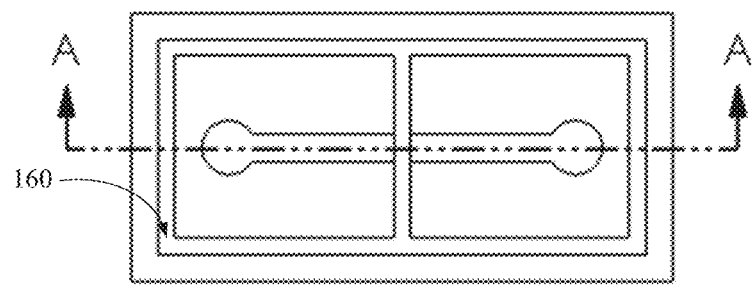
Figure 3C:

FIG. 3a illustrates an example embodiment where substrate 140 is not an insulating substrate. In this embodiment, the first channel 110 and the second channel 120 are electrically isolated from each other by an insulating channel 160. With this approach, substrate 141 may be an insulating substrate and the channel may be formed (e.g. etched, machined) to the full depth of substrate 140 so as to completely electrically isolate the first reservoir 111, channel 110 and interface 112 from the second reservoir 121, channel 120 and interface 122. The insulating channel 160 may also comprise the output channel 130.

FIG. 4a illustrates an example embodiment where the first interface 112 and the second interface 122 comprise hydrophobic capillary stop valves. While the Figures of 4a, 4b, 4c, 4d, 4e and 4f show similarities to the embodiment of FIGS. 1a, 1b, 1c and 1d, it can be seen that the first interface 112 and the second interface 122 do not form geometric capillary stop valves because the output channel 130 may be formed at the same depth in substrate 140 as the first interface 112 and the second interface 122. Other configurations are possible, but a notable feature in this embodiment is the hydrophobic patches which can arrest fluid flow at the first interface 112 and the second interface 122. In other respects, the operation of this embodiment is the same as the embodiment of FIGS. 1a, 1b, 1c and 1d. However, in some embodiments comprising hydrophobic capillary stop valves, activation may occur on the application of an electrical potential difference by the first meniscus extending into the output channel 130 and changing the effective contact angle between it and one of the surfaces sufficiently to overcome the effect of the capillary stop valve. Embodiments employing a hydrophobic valve at the first interface 112 and a geometric valve at the second interface 122, or indeed vice versa, would also function.

Figure 5A:
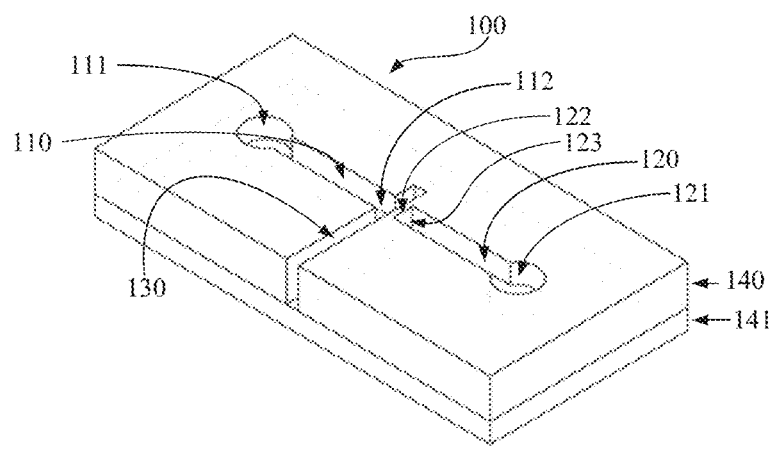
FIG. 5a presents a perspective view of a representative embodiment where the second channel comprises a blocking membrane made of the same material as substrate 140.
Figure 5B:
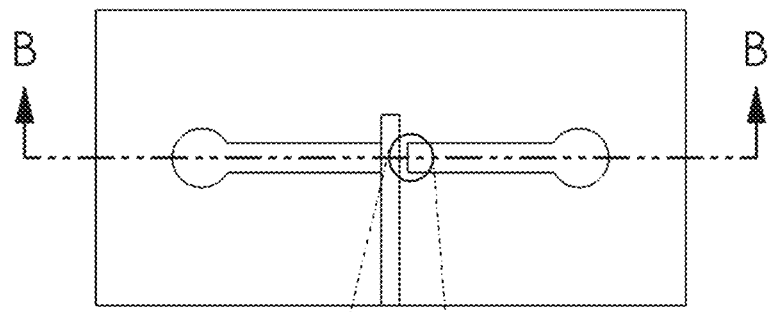

FIG. 5a illustrates an example embodiment where the first interface 112 comprises a geometric capillary stop valve and the second interface comprises a blocking membrane 123. In this example, the blocking membrane 123 may be made from the same material as the substrate 140, but may be formed from other materials. Embodiments employing a second interface comprising a blocking membrane 123 may alternatively employ a first interface 112 comprising a hydrophobic capillary stop valve if required.

The operation of the example embodiment of FIG. 5a may similar to the previous embodiments. When the first fluid is loaded into the first reservoir 111, it can travel by capillary action through the first channel 110 to the first interface 112 where its flow can be arrested. The second fluid is not required to flow, but may be required to be present at the second interface 122 and provide a continuous link to where it can be convenient to make the electrical connection.

Activation may occur on the application of an electrical potential difference between the first fluid and the second fluid by the first meniscus extending into the output channel 130 and changing the effective contact angle between it and one of the surfaces it is in contact with sufficiently to overcome the effect of the capillary stop valve.

Figure 6A:
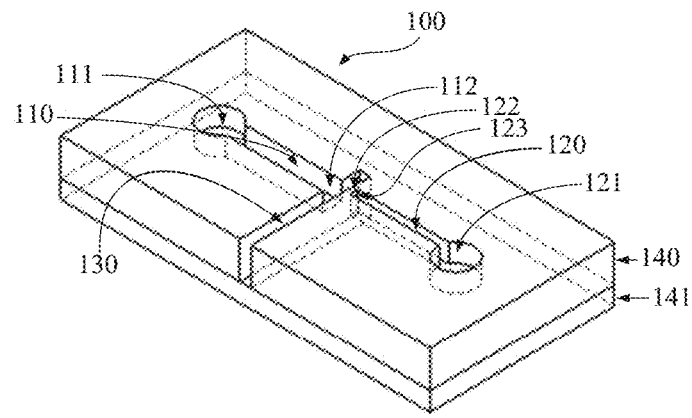
FIG. 6a presents a perspective view of a representative embodiment where the cross-sectional area of the first channel at the first interface is larger than the cross-sectional area of the second channel at the second interface. It also shows the second interface comprising a blocking membrane.
Figure 6B:
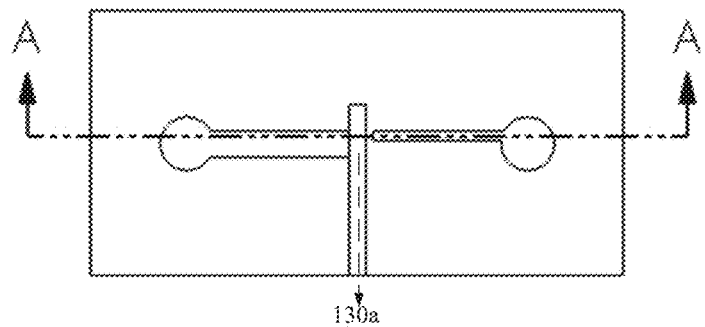
Figure 6C:
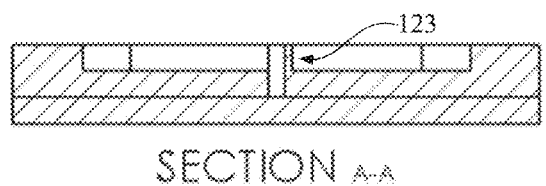
Figure 7A:
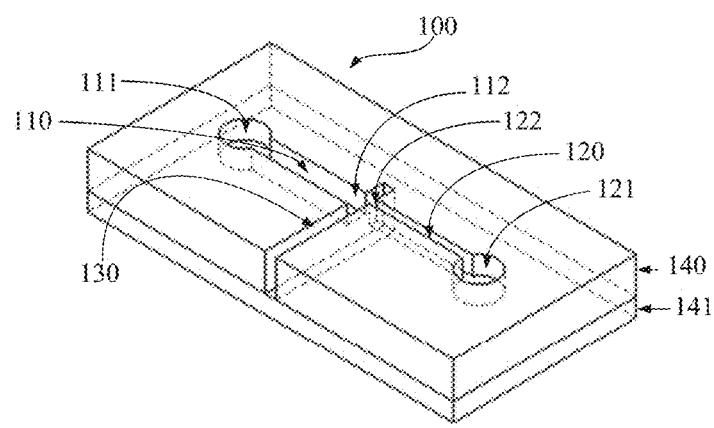
FIG. 7a presents a perspective view of a representative embodiment where the cross-sectional area of the first channel at the first interface is larger than the cross-sectional area of the second channel at the second interface. This embodiment illustrates both the first interface and the second interface comprising a geometric capillary stop valve.

FIG. 6a and FIG. 7a illustrate embodiments where the cross sectional area of the first channel 110 at the first interface 112 may be larger than the cross sectional area of the second channel 120 at the second interface 122. The principle is extended in the example embodiment of FIG. 8a where the output channel 130 can increase in cross sectional area when following the direction of intended fluid flow 130a. This embodiment may be useful when particle suspensions are used and the particles are large as is the case with biological cells.

Figure 13:
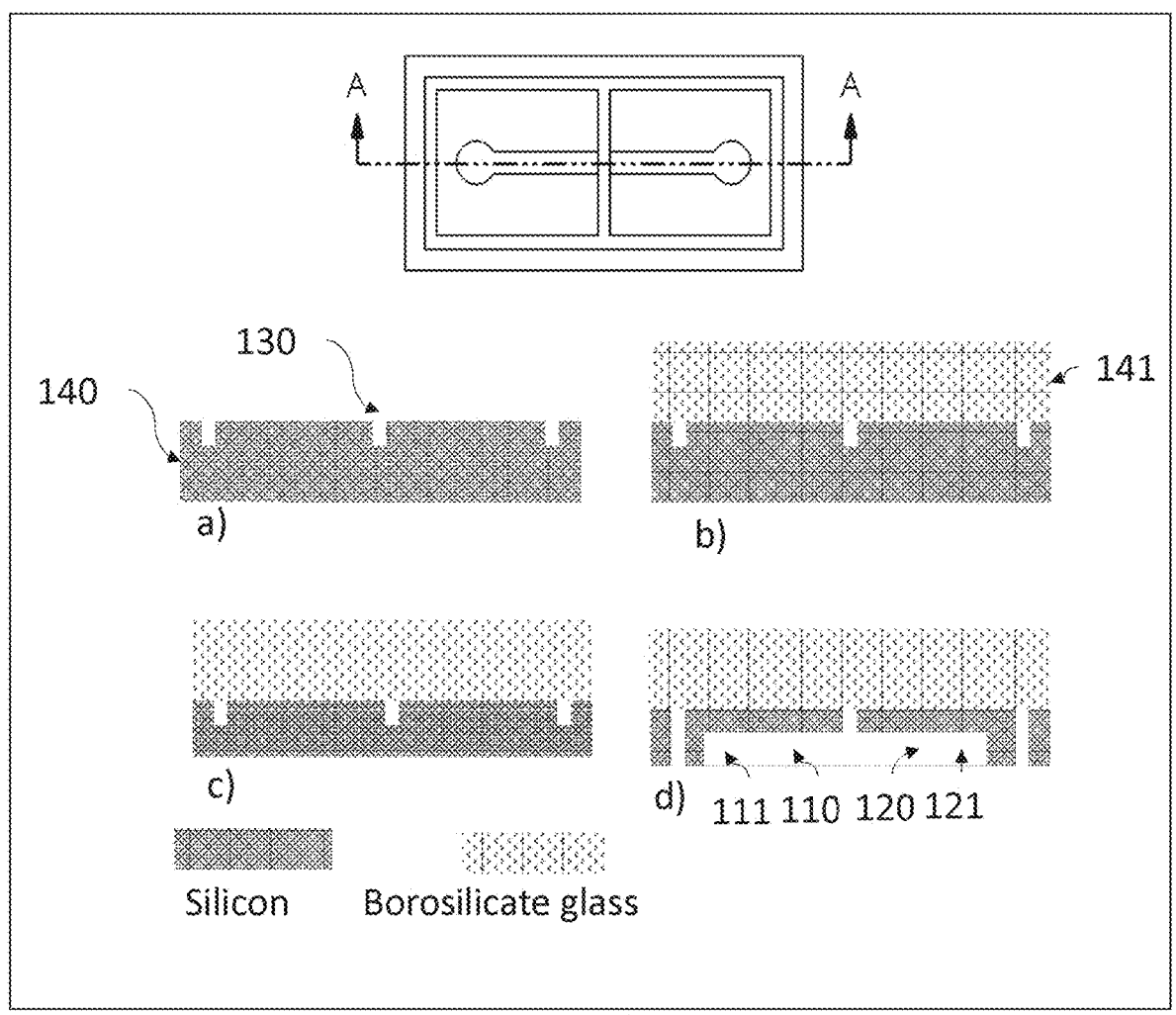
FIG. 13, parts a, b, c and d, disclose an example embodiment of a manufacturing process for a microfluidic device comprising an electrically activated passive capillary stop valve.

A possible fabrication flow based on silicon and borosilicate glass can be explained below, with reference to the embodiment of FIG. 13, parts a-d.

Step 1: The structures in the finished device that will be etched completely through substrate 140 can be etched to a depth on the front side of substrate 140. This depth can provide the vertical discontinuity in the capillary valve. In principle, a few μm are enough for this purpose, but the depth can also be 10 μm or 100 μm (see FIG. 13, part a).

Step 2: The borosilicate substrate 141 can be anodically bonded to substrate 140. (see FIG. 13, part b)

Step 3: The substrate 140 can be thinned down to a given depth (see FIG. 13, part c). This operation can be performed to decrease the thickness to be etched in the following step in order to connect structures from the frontside and the backside of the silicon. A smaller thickness can decrease the etch time, which can be convenient, but can also decrease the depth, and hence the volume of reservoirs 111 and 121 and of channels 110 and 120. Hence the thickness to which substrate 140 may be thinned can be determined by considerations related to microfluidic design. Typical thickness can be in the 200-500 μm range.

Step 4: The channels 110 and 120 and the reservoirs 111 and 121 can be etched on the free surface of substrate 140. The depth of the etch is such that it can reach the structures patterned in the first etch.

Figure 5C:
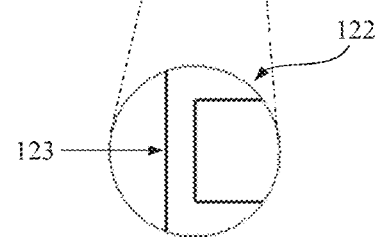
Figure 5D:
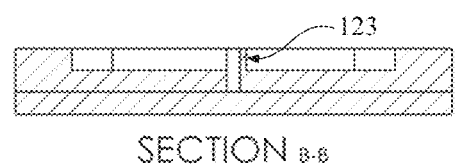

In the example embodiments of FIG. 5a and FIG. 6a, interface 122 comprises a blocking membrane 123. FIG. 5c offers a dedicated illustration of the blocking membrane 123, but it can be clearly visible in all the figures associated with these two embodiments. The blocking membrane 123 here comprises the same material as substrate 140, but may alternatively comprise any other suitable material such as metal, polymer, or glass. In one embodiment, if the membrane is manufactured using a dielectric (non-conductive) material, a thin membrane can be used (thickness of a few microns). In another embodiment, if the membrane uses a conductive material, then the thickness can be much larger (which can be mechanically stiffer and stronger).

Figure 7B:
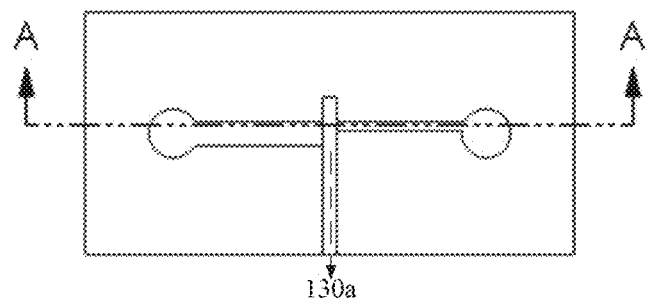
Figure 7C:
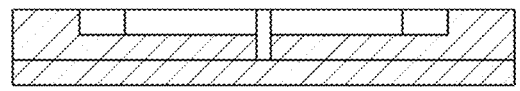

In the example embodiment of FIGS. 7a, 7b and 7c, the cross sectional area of channel 110 at interface 112 can be larger than the cross sectional area of 120 at interface 122. Decreased channel cross sectional area can lead to an increased resistance to fluid flow and thereby reduced fluid flow. Fluid flow in the second channel 120 may be further restricted by a reduced cross sectional area of channel 120 beyond interface 122 compared to that of channel 110. Additionally, the length of the second channel 120 may be increased to further reduce fluid flow which may be implemented using a serpentine or other winding pathway routing to reduce footprint on the microfluidic device.

Figure 8A:
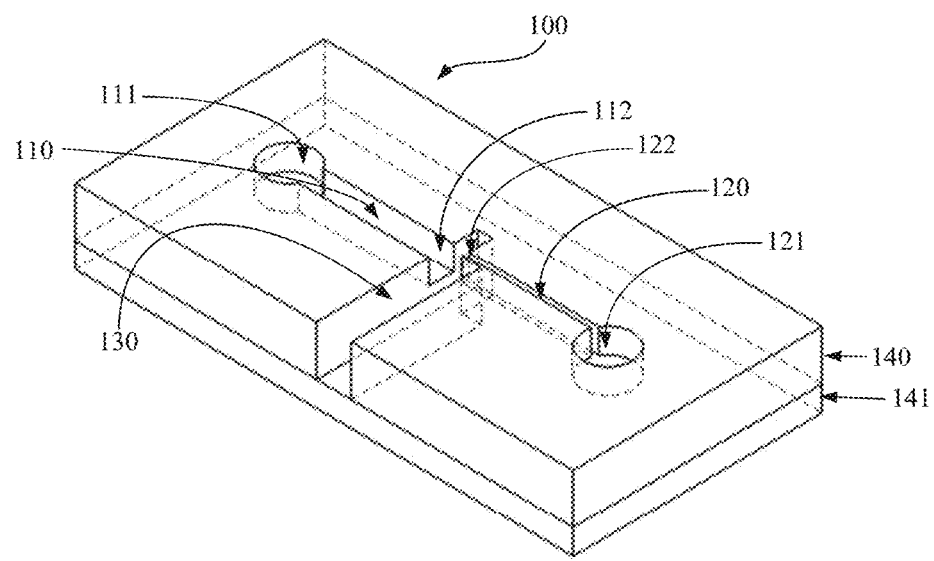
FIG. 8a presents a perspective view of a representative embodiment where the cross-sectional area of the first channel at the first interface is larger than the cross-sectional area of the second channel at the second interface. This embodiment also illustrates an increasing cross-sectional area of the output channel wherein the cross sectional area of the output channel at the downstream end 130c of the first interface is greater than the cross sectional area of the output channel at the upstream side 130b of the first interface.
Figure 8B:
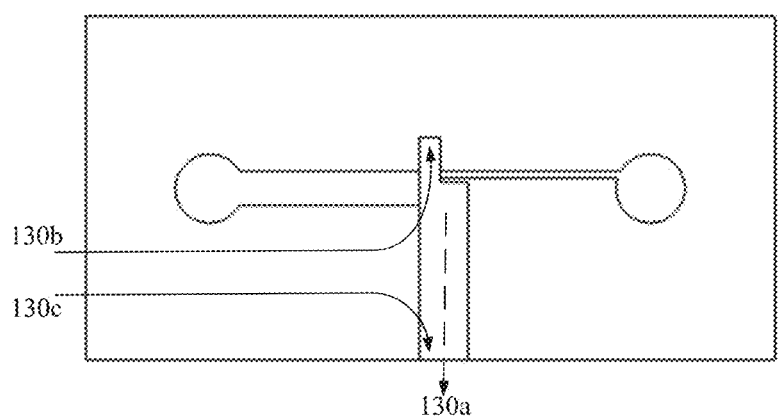

In the example embodiment of FIG. 8a and FIG. 8b, the distance between the first interface 112 and the second interface 122 may be adjusted independently of the dimensions at the downstream end 130c of output channel 130. The closer together interface 112 and interface 122 are, the lower the potential difference, i.e. the activation voltage, required to activate the capillary stop valve of interface 112. In this embodiment, the parameters associated with controllable capillary stop valve actuation can be decoupled from those associated with fluid flow. This can allow for optimizations of both these key factors and can minimize the effects of parameters related to controllable actuation impacting on fluid flow, and vice versa. This embodiment can also allow for optimization of controllable activation without impacting on the resultant fluid flow rates.

An alternative embodiment of this approach may involve an offset of interfaces 112 and 122 as may be found if, for example, channel 120 were to be increased in cross sectional area by moving the upstream 130b channel wall while the downstream 130c wall remained in the same position shown in FIG. 8b. By increasing the cross sectional area of a channel, the effects of capillary action can be reduced and activation voltage can thereby be reduced. In other embodiments, this optimization can be useful when applied to embodiments where interface 122 comprises a capillary stop valve such as those of FIG. 7a and FIG. 8a.

Figure 9A:
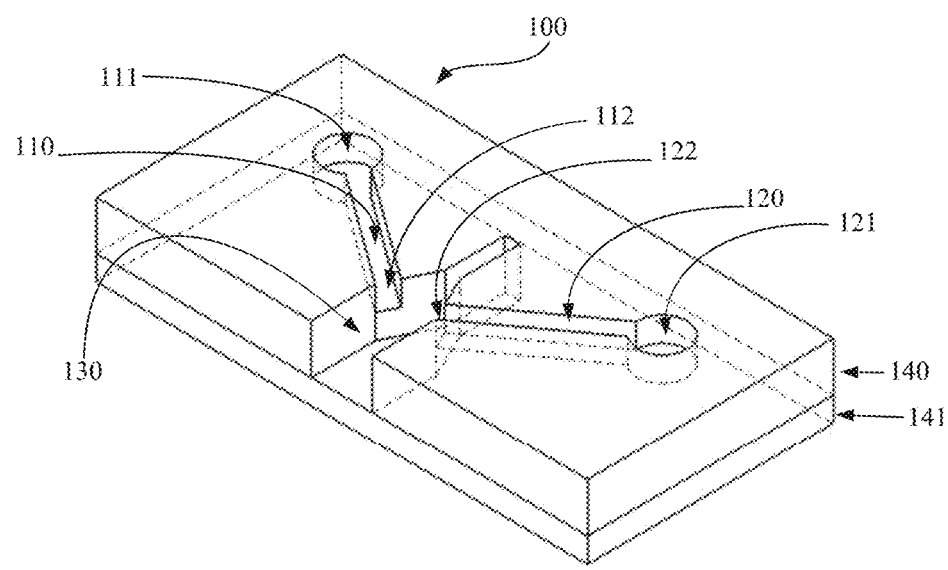
FIG. 9a presents a perspective view of a representative embodiment where the first channel interfaces with the output channel at an angle which forms an acute angle on the upstream side 130b of the interface and an obtuse angle at the downstream side 130c of the interface.
Figure 9B:
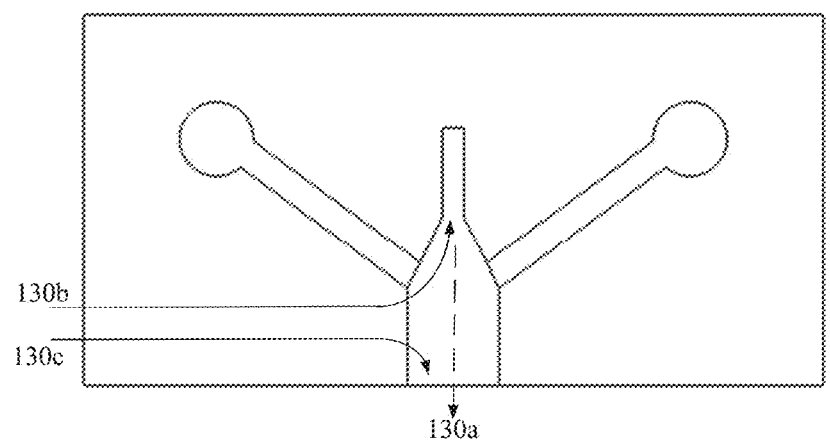

The alternative embodiment of FIG. 9a and FIG. 9b can also be configured to advantageously reduce the effects of output channel 130 dimensions on separation of the first interface 112 and the second interface 122. Dimensions of the downstream end 130c of the output channel 130 may be associated with flow requirements such as the need to facilitate the flow of particle suspensions comprising biological cells or colloids. In this embodiment, both the first channel 110 and the second channel 120 can meet the output channel 130 at the first interface 112 and the second interface 122 respectively. Each of the first channel 110 and the second channel 120 can form an acute angle on the upstream side 130b and an obtuse angle on the downstream side 130c when the angles are measured relative to the center line of the output channel as can be seen from the figures. While this configuration may be used in conjunction with an output channel 130 having parallel walls, in this example the output channel 130 can also taper such that the cross sectional area of the upstream end 130b is smaller than the cross sectional area of the downstream end 130c. The distance between the upstream end 130b of interface 112 and interface 122 can thereby be closer together than their respective downstream ends 130c. In this way, the distance between interface 112 and interface 122 may be minimized to facilitate activation of the capillary stop valve of interface 112 using a low activation voltage.

Figure 10A:
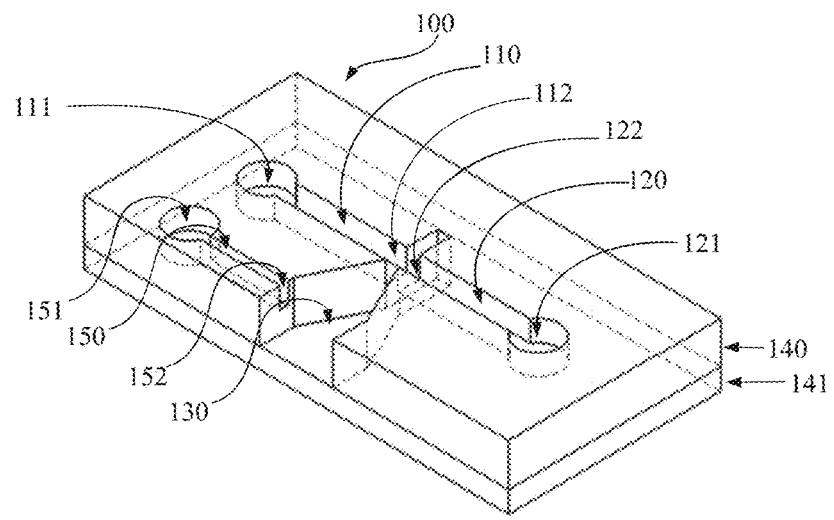
FIG. 10a presents a perspective view of a representative embodiment comprising a third channel comprising a third interface 152 with the output channel.
Figure 10B:
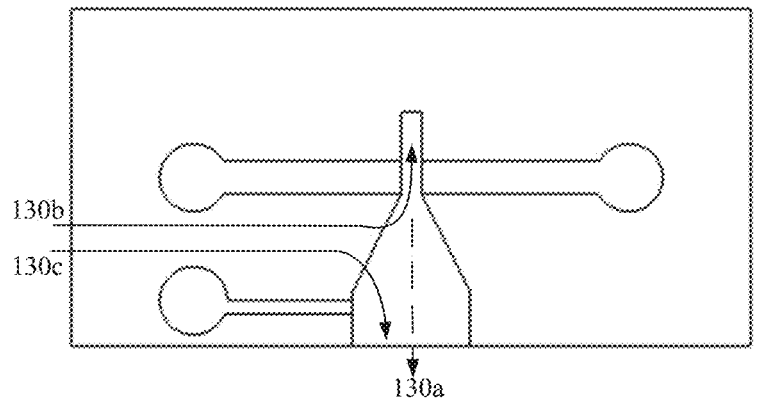

The embodiment of FIG. 10a and FIG. 10b offers an alternative configuration for reducing the effects of the dimensions of output channel 130 on the separation between interface 112 and 122. This embodiment can be useful in that such configuration can be optimized for activation of the capillary stop valve of interface 112. In this embodiment, the microfluidic device 100 additionally comprises a third channel 150 for containing a fluid, wherein the third channel 150 comprises a third interface 152 with the output channel 130 and the third interface 152 comprises a capillary stop valve. The device can be configured such that when fluid flows from the first channel 112 and along the outlet channel 130, it can come into contact with the third interface 152. This fluid contact can activate the capillary stop valve of the third interface 152 thereby allowing fluid to flow from interface 152 into the output channel 130. In this embodiment, fluids used for activation may be kept to a minimum, needing only to be sufficient to activate the capillary stop valve of interface 152 and consequently can have little impact on composition of the fluid flowing after activation. Hence, the fluids being used for the activation may be selected mainly for their properties in this context, e.g. for their viscosity. Optimization of the configuration of interface 112 and interface 122 may take this into account and additionally comprise selection of the cross sectional area of the first channel 110 and the second channel 120, or the distance between and orientation of the first interface 112 and the second interface 122.

Figure 11:
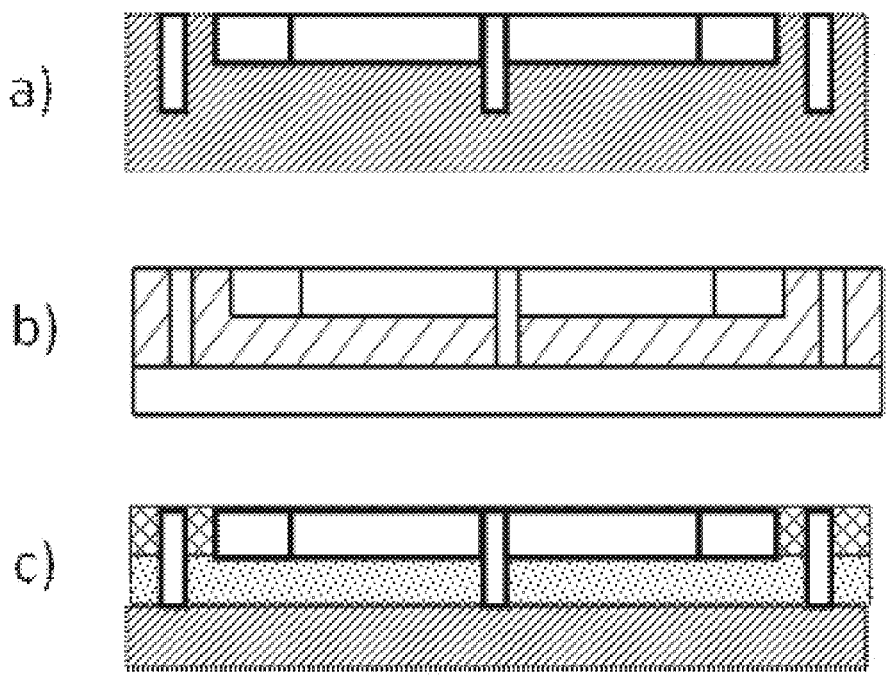
FIG. 11, parts a, b, and c, present cross-sectional elevations of FIG. 3 illustrating that devices may be implemented using 1, 2 or 3 substrate layers.
Figure 12A:
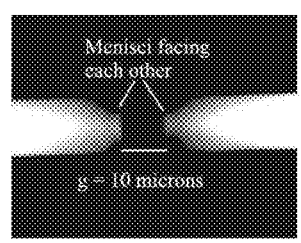
FIG. 12a shows a photograph of a capillary stop microvalve before activation. The photograph was produced with a fluorescence microscope using rhodamine dye. It can be seen that the first fluid meniscus is arrested at the first interface and the second fluid meniscus is arrested at the second interface.
Figure 12B:
FIG. 12b shows a photograph of a capillary stop microvalve after activation. It can be seen that the first fluid and the second fluid are now flowing freely into the output channel 130.

FIG. 11, part a; 11, part b; and 11, part c show embodiments which illustrate that the microfluidic device 100 may be based on using 1, 2, 3 or more substrate layers. Each substrate layer may be a different material, or in embodiments where 3 or more substrate layers are used, the device may comprise at least 2 different materials. These materials may be those commonly found in polymer, glass or silicon fabrication processes. These various embodiments can help facilitate multiple methods of manufacture and integration into any microfluidic manufacturing process technology. When a single substrate is used as illustrated in the embodiment of FIG. 11, part a, the device may be manufactured by molding or etching. When two substrate layers are used as shown in the embodiment of FIG. 11, part b, the substrate layer 140 comprises a photo-patternable polymer (e.g. SU-8), while substrate layer 141 comprises glass or silicon. In an alternative embodiment of FIG. 11, part b substrate layer 140 comprises silicon and substrate layer 141 comprises borosilicate glass. There are many known materials and material combinations which are suitable and may be used, the manufacture of microfluidic device 100 is not restricted to using those specifically listed above.

As can be seen from FIG. 1a to FIG. 1d, fluid in this embodiment flows horizontal relative to the substrate 140 and 141, i.e. parallel to or in the same plane as these substrates. The orientation of microfluidic device 100 does not alter this flow plane because capillary action dominates over gravitational forces. However, for some orientations, additional substrate layers may be required to fully contain the fluid. Similarly, as can be seen from FIG. 2a to FIG. 2d, the term vertical flow can also be considered relative to substrate 140, 141, and 142 in this embodiment, i.e. fluid can flow orthogonal to the plane of these substrates. It is also shown in FIG. 2a to FIG. 2d that a microfluidic device 100 may include both horizontal and vertical flow in a single device. When implemented in a microfluidic device 100, these defined flows can be only be substantially vertical or substantially horizontal due to variations in manufacturing processes. However, the basic principles of microfluidic device 100 are applicable to fluid flows in any orientation. Similarly, embodiments indicated as being applicable to horizontal flows are also applicable to vertical flows and vice versa, and may also be applied in other orientations.

The invention claimed is:

1. A microfluidic device for electrically activating a passive capillary stop valve comprising: an output channel; a first channel for containing a first fluid, wherein the first channel comprises a first interface with the output channel, and the first interface comprises: a first capillary stop valve; and a second channel for containing a second fluid, wherein the second channel comprises a second interface with the output channel, and the second interface comprises a second capillary stop valve, wherein the first channel and the second channel are electrically isolated from each other, and wherein the first interface and the second interface are arranged relative to each other such that when the first fluid is present in the output channel due to activation of the first capillary stop valve when the first fluid and the second fluid are present, and an electrical potential difference is configured to be applied between the first fluid and the second fluid, the first fluid contacts the second interface and is configured to activate the second capillary stop valve of the second interface thereby establishing fluid flow from the second channel into the output channel.

2. The microfluidic device according to claim 1, wherein the first interface and the second interface are configured to activate fluid to flow substantially horizontally or substantially vertically from the first channel into the output channel.

3. The microfluidic device according to claim 1, wherein the second capillary stop valve is a hydrophobic capillary stop valve.

4. The microfluidic device according to claim 1, wherein the second capillary stop valve is a geometric capillary stop valve.

5. The microfluidic device according to claim 1, wherein the first fluid and the second fluid are electrically conductive.

6. The microfluidic device according to claim 1, wherein the cross sectional area of the first channel at the first interface is larger than the cross sectional area of the second channel at the second interface.

7. The microfluidic device according to claim 1, wherein when following a direction of intended flow in the output channel, the cross sectional area of the output channel increases.

8. The microfluidic device according to claim 1, further comprising a third channel for containing a third fluid, wherein the third channel comprises a third interface with the output channel, wherein the third interface comprises a capillary stop valve, and wherein the third interface is arranged such that when a first fluid is present in the output channel due to activation of the first capillary stop valve of the first interface, said first fluid contacts the third interface and activates the capillary stop valve of the third interface.

9. The microfluidic device according to claim 1, wherein the first interface and the second interface are arranged relative to each other so as to be substantially facing each other at opposite sides of the output channel.

10. An apparatus for chemical and/or biochemical processing comprising the microfluidic device according to claim 1.

11. The apparatus according to claim 10, wherein the first fluid and the second fluid are electrically conductive.

12. The apparatus according to claim 10, wherein the second capillary stop valve is a geometric capillary stop valve.

13. The apparatus according to claim 10, wherein the secondary capillary stop valve is a hydrophobic capillary stop valve.

14. A method for electrically activating a passive capillary stop valve comprising:
a) channelling, by capillary action, a first fluid to a first interface with an output channel;
b) arresting the flow of the first fluid at the first interface with the output channel using a first capillary stop valve;
c) arresting a second fluid at a second interface with the output channel using a second capillary stop valve;
d) arranging the first interface and the second interface relative to each other; and
e) applying an electrical potential difference between the first fluid and the second fluid thereby attracting the first and second fluids toward each other and overcoming an arresting effect of the first capillary stop valve to activate the first fluid to flow into the output channel and overcoming an arresting effect of the second capillary stop valve when the first fluid contacts the second interface thereby activating the second fluid flow into the output channel.

15. The method according to claim 14, wherein the first fluid and the second fluid are electrically conductive.

16. The method according to claim 14, wherein the second capillary stop valve is a hydrophobic capillary stop valve.

17. The method according to claim 14, wherein the capillary stop valve is a geometric capillary stop valve.

18. The method according to claim 14, wherein the first fluid is of a different type than the second fluid.

* * * * *